Sept. 6, 1927.
B. W. CONNELY
1,641,801
JOINT FOR STRUCTURAL TOWERS
Filed Jan. 19, 1927
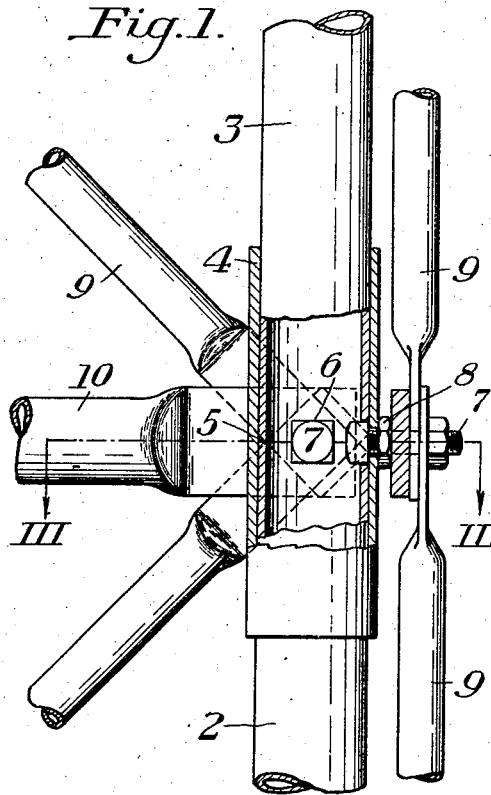
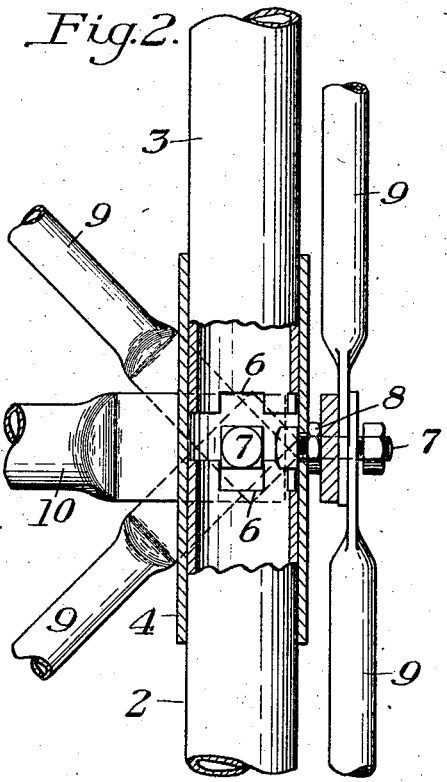
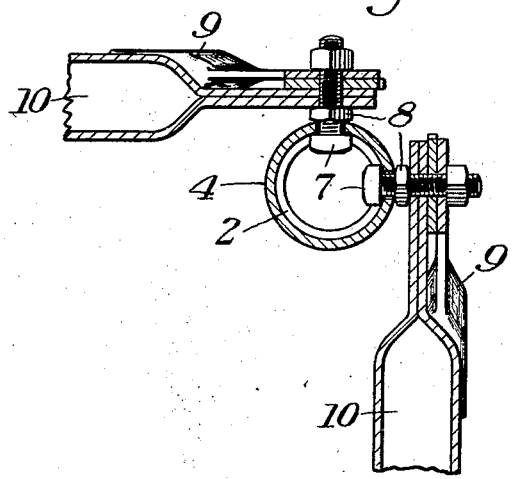
INVENTOR
Bush W. Connely
by Christy and Christy
his attorneys Patented Sept. 6, 1927.

1,641,801

UNITED STATES PATENT OFFICE.

BUSH W. CONNELY, OF PITTSBURGH, PENNSYLVANIA, ASSIGNOR TO DRAVO EQUIPMENT COMPANY, OF PITTSBURGH, PENNSYLVANIA, A CORPORATION OF PENNSYLVANIA.

JOINT FOR STRUCTURAL TOWERS.

Application filed January 19, 1927. Serial No. 162,029.

This invention relates to structural towers, and more especially towers of a knock-down type, particularly those used as temporary elevators by contractors, etc., and relates more particularly to a joint for such towers.

In towers of the type referred to, the structure is built up in sections, and the leg elements of the sections are connected by means of a sleeve into which the leg elements project. The sections are completed by diagonal braces and horizontal girds, and these braces and girds are secured by bolts to the sleeves which constitute the connecting means for the leg elements. The present invention relates to a joint of this kind wherein means are provided for preventing the securing bolts from turning. The structure is rendered more secure and may more easily be erected and taken apart.

The invention will be readily understood by reference to the accompanying drawings, which illustrates a structure embodying it.

Figure 1 is a fragmentary view in side elevation of a portion of a tubular tower structure with the joint shown in section.

Figure 2 is a similar view showing the leg element shifted out of place, for purposes of illustration.

Figure 3 is a transverse horizontal section on the plane of line III—III of Figure 1.

In the drawings, 2 designates the upper end of a leg element of a lower tower section, and 3 is the lower end of a leg element of an upper tower section. The leg elements 2 and 3 extend into a connnecting sleeve 4, and the ends of the leg elements abut within the sleeve, as indicated at 5. The ends of the leg elements are notched out at 6, so as to fit over the polygonal head of one or more bolts 7. These bolts project through the sleeve and externally of the sleeve carry jam nuts 8, by which the bolts may be secured in position, with their heads drawn against the inner wall of the sleeve. The diagonal braces 9 and the horizontal girds 10 are secured to these bolts 7.

In the usual practice, the bolts 7 are applied to the sleeve and the jam nuts 8 tightened before the sleeve is introduced into the tower structure. The engagement of the head of the bolt upon the cylindrical inner surface of the sleeve, as clearly shown in Figure 3, will tend to hold the bolt against rotation. In assembly the leg elements 2 and 3 are brought to position within the sleeve, with the notches 6 engaging the heads 7 of the bolts. The notches 6, fitting close about the bolt heads, serve to hold the bolts against rotation, and the nuts 8 may be tightened and loosened upon a rigid bolt.

While I have shown my invention incorporated in a tubular tower of preferred construction, it will be understood that it it not confined to use in the particular tower structure illustrated, but that it may be otherwise embodied, and that various changes and modifications may be made therein within the spirit of my invention, and under the scope of the following claims.

I claim as my invention:

1. A joint for tubular structural elements and the like including a sleeve, a bolt passing through the sleeve, and a notched leg element extending within the sleeve with the notch therein engaging the bolt and holding the bolt against rotation.

2. A joint for structural towers and the like including a leg element with notched end, a sleeve into which the leg element extends, a bolt with polygonal head passing through the sleeve, the leg element by its notch engaging the polygonal head of the bolt.

3. A joint for structural towers and the like including abutting leg elements notched at their ends, a sleeve into which the abutting leg elements extend, bolts with polygonal heads passing through the sleeve having their heads on the inside thereof, the leg elements engaging by the notches in their ends the heads of the bolts.

4. A joint for a structural tower in which is found the structure defined in claim 1, together with a bracing member secured to said bolt.

5. A joint for a structural tower including a cylindrical sleeve, a bolt with polygonal head extending from within the sleeve transversely through the sleeve wall and secured with its head engaging the inner wall of the sleeve, and a notched leg element extending within the sleeve and engaging by its notch the head of the bolt.

In testimony whereof I have hereunto set my hand.

BUSH W. CONNELY.